(No Model.)
C. CLOSZ.
GRAIN SEPARATING SCREEN FOR THRASHING MACHINES.
No. 548,153. Patented Oct. 15, 1895.
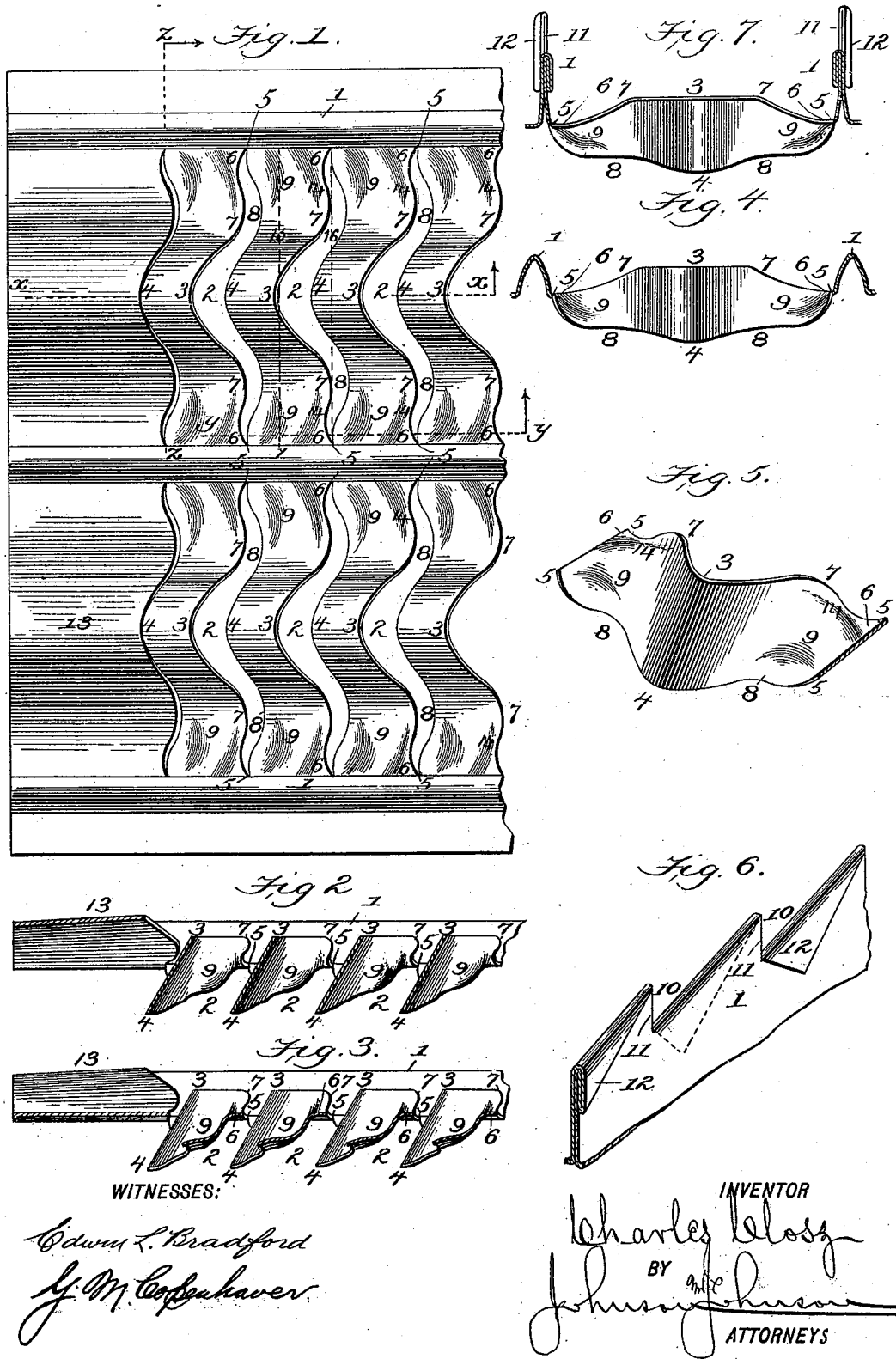
WITNESSES:
Edwin L. Bradford
G. M. Copenhaver
INVENTOR
Charles Closz
BY
Johnson & Johnson
ATTORNEYS

UNITED STATES PATENT OFFICE.

CHARLES CLOSZ, OF WEBSTER CITY, IOWA.

GRAIN-SEPARATING SCREEN FOR THRASHING-MACHINES.

SPECIFICATION forming part of Letters Patent No. 548,153, dated October 15, 1895.

Application filed April 16, 1895. Serial No. 545,886. (No model.)

*To all whom it may concern:*

Be it known that I, CHARLES CLOSZ, of Webster City, in the county of Hamilton and State of Iowa, have invented a new and useful Improvement in Grain-Separating Screens for Thrashing-Machines, of which the following is a specification.

The screen produced by my present improvement is for separating the grain and the chaff from the straw as it is carried out from the cylinder of a thrashing-machine to the straw-stack by the vibratory movement of the carrier, which is operated from the thrashing-cylinder.

The construction of the separating-surface which constitutes my present improvement is illustrated in the accompanying drawings, which, in connection with the following description and the concluding claims, will precisely set out the parts which distinguish between what is old and what is claimed as new.

Referring to the drawings, Figure 1 shows in top view so much of a corrugated metal screen of transverse openings as illustrates the improved construction. Fig. 2 is a vertical longitudinal section of the same, taken centrally, crossing the openings on the line $xx$ of Fig. 1. Fig. 3 is a similar section taken on the line $y\,y$ of Fig. 1. Fig. 4 is a cross-section on the line $z\,z$ of Fig. 1, looking toward the delivery end of the screen, the line of section being taken through the transverse opening between the corrugations. Fig. 5 shows in perspective the formation of the surface one of the strips between the openings. Fig. 6 shows a portion of one of the corrugations of the screen in perspective, illustrating a novel construction of notching the corrugations. Fig. 7 is a transverse section of the same.

It will be understood that the screen is of sheet metal, the corrugations and openings whereof are struck up so as to form a stiff platform, and that it is mounted to receive the straw and grain from the thrashing-cylinder and carry off the straw and separate the grain and chaff from it through the screen-openings by an endwise vibratory movement of the screen and an air-blast provided beneath the screen to separate the chaff and fine straw from the grain.

The screening-surface is produced by transverse openings formed between longitudinal corrugations 1, the distance between which may be from one and a half to three and a half inches, and the number of the corrugations will be governed by the width of the platform.

The corrugations extend from the receiving to the delivery end of the platform and may be constructed as I shall presently state. The openings between the corrugations are formed by cuts approximating the form of a bow and the surface between them is so formed and shaped as to present edges raised above the base-lines of the corrugations and depressed below them, so that the between surface will stand inclining downward toward the receiving end of the screen. The openings thus formed between the top edge of one surface and the bottom edge of the next contiguous surface have their greatest width along a longitudinal line mediately between the corrugations. At this part 2 of greatest width of the openings the top edge 3 is turned back and concave, the corresponding bottom edge 4 is convex, and the surface between these edges 3 and 4 is steep, about forty-five degrees from a vertical line, and convex and concave and less steep on each side of the middle, as at 9, Fig. 3.

The ends 5 of the cuts join the base of the corrugations, and the surface 6 6 at such ends is flat along the corrugations, while the top edge from such flat surface joins the turned-back concave part 3 by a forward standing convex part 7 about midway between the ends 5 5 and the middle line of the concave 3. This gives the lower edge 8 of the surface a concave form corresponding to the top convex part 7. Between the top flat surfaces 6 6 and the lower concave edges 8 8 there is a depression 9, curving from the corrugation into the concave edge 8. From its widest part 2 the opening decreases in width and the steepest part of the surface is at its turned-back part 3. This steep surface is at the widest part of the opening and affords a free and unobstructed discharge for the grain. The concave or turned-back center of the top edge and its steep convex surface is for the purpose of directing the straw toward and over the forward sloping edges, which terminate in the forward standing convex parts, and it is important to notice that this top edge between the convex parts 7 7 is horizontal and forms a level ridge and cross-support for the straw, as seen in Figs. 4 and 7. The flat surfaces 6 6 along the corrugations serve to facilitate the forward movement of the straw as it slides over the edges, which curves from the convex parts 7 7 to and upon the flat surfaces. The depressions 9 9 serve to check and prevent the movement of the grain with the straw over the edge between the convex parts 7 7 and the flat surfaces 6 6 and to direct it downward through the opening. For this purpose I form a ridge 14, extending from the flat surface 6 above the cavity 9 and about parallel with the edge of the strip to the parts 7.

The corrugations serve to stiffen the platform and stand above the top edges of the separating-surface to carry the straw above it and so hold it in a more loose condition, and thereby facilitate the separation of the grain and the chaff from the straw. For this purpose the top edges of the corrugations may be unbroken, as shown in Fig. 2, or they may be notched, as shown in Fig. 6. When so notched I make the corrugations higher above the separating-surface and with their walls joined, so that the notches 10 can be made saw-tooth shaped in the top edges, as if in a single plate, with the shoulder 11 of the notches standing toward the delivery end of the screen. These notches, while serving to give a more effective movement to the straw and to hold it better above the surface, are utilized to give strength to the corrugations, both sidewise and vertically, by turning the cut parts, as laps 12, over upon and against the sides of the corrugations. The lapping of the cut parts may be made on alternate sides to equalize the bracing or on one side only of the corrugations, and it is done by bending the cut parts and turning them down as laps flat against the walls by pressing or hammering, so that they form laps of four thicknesses, very greatly increasing the strength of the corrugations and of the sheet which forms the platform.

It is important to notice that the flat surfaces 6 6 at the ends of the cuts are considerably in advance, looking toward the delivery end of the screen, of the turned-back concave center point 2, so that the edge from the concave 3 to the convex parts 7 stands obliquely forward from each side of the concave, which gives a parting sidewise feed to the straw to open it as it moves forward and sidewise to the flat surfaces. It is also important to notice that the convex turned-back center part is much steeper than the concave part which joins the flat surfaces, so that these steep convex parts serve to stiffen the platform mediately between the corrugations, as seen in Figs. 2 and 3.

The strengthening and bracing of the screen by the reinforcing of its corrugations by notching and lapping the metal from said notches upon the sides of the corrugations may be used with any suitable construction of separating-surface.

The steep pitch of the surface seen in Figs. 2 and 3 is at the middle of the length of the opening, and at this point the latter is widest, and this, so far as I know, is a new construction. The level top edge of the strip is between the parts 7 7, Fig. 1, and 3 7, Figs. 2 and 3, and from these parts 7 7 the edge curves downward to the corrugations. This construction is also new to me, and I obtain this construction by the deep-set back 3 at the top edge of the strip, so that at this set-back point the top edge will be considerably back of the dotted line 16, drawn from the ends of the opening, and will intersect a cross line 15 at about mediately the width of said strip, as seen in Fig. 1. This is a feature wherein my improvement resides for effecting a free and unobstructed delivery of the grain and chaff from the straw, and the freest movement of the straw over the edge of the strips.

I claim as my improvement—

1. A sheet metal screen for separating grain having corrugations and between them transverse openings, the strips providing said openings, each having its upper edge set-back of the transverse line 16 at a point mediately of the length of said strip, so that the greatest depth of such set-back will intersect a line drawn about mediately the width of such strip, the upper surface at said set-back, being convex and of greater pitch than the surface at the ends of the strip, whereby the openings have their greatest width mediately of their length, for the purpose stated.

2. A sheet metal grain separating screen having corrugations and between them transverse openings, the strips providing said openings having steep convex pitch mediately of their length and which merges into less pitch toward each end, the surface depressions 9, 9, and the ridges 14, 14 extending from the flat surfaces 6, 6 about parallel with the top edge to the parts 7, the said top edge being set back of a line connecting the ends of the opening, to about half the width of the strip, substantially as described.

3. A sheet metal grain separating screen having parallel corrugations and between them, openings, the said corrugations having their upper edges notched and the metal displaced by said notching turned down as laps against the vertical wall of said corrugations and forming thereby saw-tooth shaped notches, for the purpose stated.

4. A sheet metal grain separating screen having openings separated by parallel corrugations which have their upper edges of saw-tooth form, the metal displaced to form such teeth being turned down alternately on opposite sides of the said corrugations to equalize the bracing and strengthening effect of such laps upon the corrugations and the screen.

In testimony whereof I have hereunto signed this specification in the presence of two subscribing witnesses.

CHARLES CLOSZ.

Witnesses:
GEO. WAMBACH,
B. R. DUTTON.